United States Patent Office 3,254,975
Patented June 7, 1966

3,254,975
HYDROCARBON FUELS CONTAINING
BORON ESTERS
Glenn E. Irish, Fullerton, Calif., and James B. Hinkamp, Birmingham, and John D. Bartleson, Franklin, Mich., assignors to Ethyl Corporation, New York, N.Y., a corporation of Virginia
No Drawing. Original application Apr. 19, 1956, Ser. No. 579,127. Divided and this application Feb. 17, 1960, Ser. No. 9,186
6 Claims. (Cl. 44—75)

This is a division of S.N. 579,127 filed April 19, 1956.
This invention relates to new compositions of matter, more particularly to new esters of boron acids.

Various boron compounds have been proposed as fuel additives. These have suffered from the disadvantages that their effectiveness was slight; that they were unstable towards hydrolysis; that they were limited in utility to only one or a few types of hydrocarbons; etc. The petroleum industry would greatly benefit by provision of boron compounds which are highly effective in improving a wide range of hydrocarbon types and which are hydrolytically stable.

An object of this invention is to provide new compositions of matter. A further object is to provide hydrolytically stable boron esters. Still another object is to provide new compositions of matter which have high effectiveness in improving the characteristics of liquid hydrocarbons. Still another object is to provide new processes for treating liquid hydrocarbons so as to improve their properties. An additional object is to provide new compositions of mater which comprise liquid hydrocarbons which have been treated with the improved new compositions of matter of this invention.

In accordance with the present invention, new compositions of matter are provided which consist of esters of acids of boron wherein the hydroxyl groups of said boron acid are esterified with 2,6-dialkyl phenols.

In general the esters of this invention can be prepared from or derived from any acid of boron, including orthoboric acid ($H_3BO_3$), metaboric acid ($HBO_2$), pyroboric acid ($H_4B_2O_5$), sometimes referred to as mesaboric acid), the various polyboric acids, boronic acid ($H_3BO_2$), borinic acid ($H_3BO$), etc. Suitable esters of this invention can also be prepared by esterifying the sulfur analogs of the above boron acids.

The new metaborates of this invention, which are preferred compounds because of their outstanding effectiveness, can be represented by the following structural formula

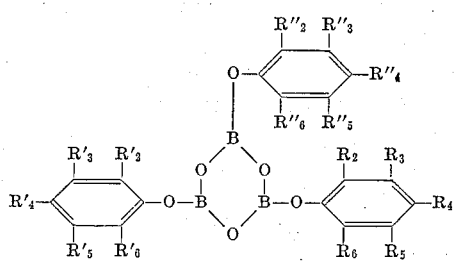

Thus, our new metaborates are tri(2,6-dialkylphenyl)trimeric metaborate, $R_2$, $R'_2$, $R''_2$, $R_6$, $R'_6$ and $R''_6$ are alkyl radicals of 2 to 12 carbon atoms, preferably 4 to 8 carbon atoms wherein the alkyl radical is tertiary. $R_3$, $R'_3$, $R''_3$, $R_4$, $R'_4$, $R''_4$, $R_5$, $R'_5$, $R''_5$, $R_6$ and $R''_6$ are selected from the group consisting of hydrogen, alkyl radicals, alkoxy radicals, halogen atoms, nitro groups, cycloalkyl radicals, amino groups, acyl radicals and carbalkoxy radicals. A preferred embodiment of this aspect consists of providing new compositions of matter wherein $R_2$, $R'_2$, $R''_2$, $R_6$, $R'_6$ and $R''_6$ are tertiary alkyl radicals of 4 to 8 carbon atoms; all the other R's are hydrogen and all the aryl groups are the same. Examples of this especialy preferred embodiment include tri(2,6-di-tert-butylphenyl) trimeric metaborate, tri(2,6-di-tert-octylphenyl)trimeric metaborate, etc.

The new orthoborates of this invention can be represented by the following structural formula

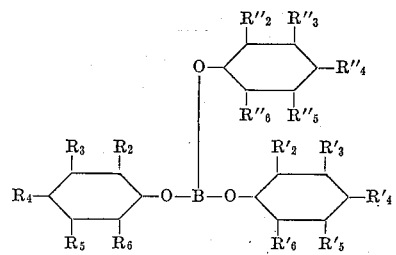

wherein all the R's have the same meaning as in the above metaborates. Thus, we provide tri(2,6-dialkylphenyl) orthoborates. A preferred embodiment of this aspect consists of providing new compositions of matter wherein $R_2$, $R'_2$, $R''_2$, $R_6$, $R'_6$ and $R''_6$ are tertiary alkyl radicals of 4 to 8 carbon atoms; all of the other R's are hydrogen and the three aryl groups are the same. Examples of this especially preferred embodiment include tri(2,6 - di - tert - butylphenyl)orthoborates, tri(2,6-tert-amylphenyl)orthoborate, and the like.

The new pyroborates of this invention can be represented by the following structural formula

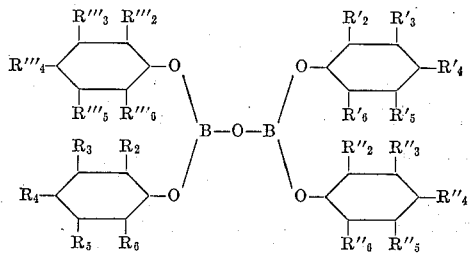

wherein all the R's have the same meaning as above. A preferred embodiment of this aspect consists of providing new compositions of matter wherein $R_2$, $R'_2$, $R''_2$, $R'''_2$, $R_6$, $R'_6$, $R''_6$ and $R'''_6$ are tertiary alkyl radicals of 4 to 8 carbon atoms; all the other R's are hydrogen and the four alkyl groups are the same. Thus, we provide tetra(2,6-dialkylphenyl)pyroborates. Examples of this especially preferred embodiment include tetra(2,6-di-tert-butylphenyl) pyroborate, tetra(2,6-di-tert-heptylphenyl)pyroborate, and the like.

The new boronates of this invention can be represented by the following structural formula

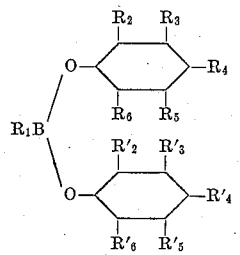

wherein all the R's on the aryl groups have the same meaning as above. $R_1$ is a hydrocarbon radical, either alkyl, aryl or cycloalkyl. A preferred embodiment of this aspect consists of providing new compositions of matter wherein $R_2$, $R'_2$, $R_6$ and $R'_6$ are tertiary alkyl radicals of 4 to 8 carbon atoms; $R_1$ is selected from the group consisting of alkyl radicals of 2 to 12 carbon atoms, aryl radicals of 6 to 10 carbon atoms and cycloalkyl radicals of 5 to 8 carbon atoms; all the other R's are hydrogen and the two aryl groups are the same. Thus, we provide di(2,6-dialkylphenyl)alkylboronates, di(2,6-dialkylphenyl)arylboronates and di(2,6-dialkylphenyl) cycloalkylboronates. Examples of this especially preferred embodiment include di(2,6-di-tert-butylphenyl) propylboronate, and the like.

The new borinates of this invention can be represented by the following structural formula

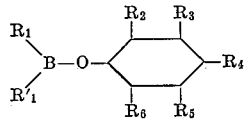

wherein the R's are the same radicals as above and $R'_1$ is selected from the group consisting of alkyl radicals, preferably from 2 to 12 carbon atoms; aryl hydrocarbon radicals, preferably of 6 to 10 carbon atoms and cycloalkyl radicals, preferably of 5 to 8 carbon atoms. A preferred embodiment of this aspect consists of providing new compositions of matter wherein $R_2$ and $R_6$ are tertiary alkyl radicals of 4 to 8 carbon atoms; $R_1$ and $R'_2$ are selected from the group consisting of alkyl radicals of 2 to 12 carbon atoms, aryl hydrocarbon radicals of 6 to 10 carbon atoms, and cycloalkyl radicals of 5 to 8 carbon atoms; and all the other R's are hydrogen. Examples of this especially preferred embodiment include (2,6-di-tert-butylphenyl)propylamylborinate, (2,6-di-tert-octylphenyl)diphenylborinate, etc.

The present invention also contemplates a process which comprises treating a liquid hydrocarbon with a boron acid ester as defined above. This invention also embraces new compositions of matter which comprise liquid hydrocarbons which have been treated with a boron acid ester as defined above. Moreover, this invention comprises new compositions of matter which consist of liquid hydrocarbons containing minor amounts of boron acid esters as defined above.

Among the liquid hydrocarbons which are improved in accordance with this invention are included hydrocarbon mixtures of the types which are normally used as fuels, as lubricating agents and as intermediates for the preparation and production of the same. Benefits are, therefore, obtained by treatment of and admixture with gasoline, jet fuel, liquefied petroleum gas, lubricating oil, diesel oil, gas oil, fuel oil, crude petroleum, and the like, with the compounds of this invention. Pure hydrocarbons are also improved by treatment with the new esters of this invention, particularly with regard to their combustion properties. Examples of such hydrocarbons include benzene, toluene, n-octane, isoheptane, and in general, pure aliphatic, cycloaliphatic and aromatic liquid hydrocarbons. In the hydrocarbons which are used as fuels, our invention imparts improved combustion properties thereto. In the case of the liquid hydrocarbons which are used as lubricating agents, our invention imparts improved thermal stability thereto. When used in the treatment of petroleum crudes and intermediate fractions, the compounds of this invention impart easier processing characteristics thereto, and, in addition, ordinarily result in improved characteristics of the finished petroleum products obtained therefrom.

The compounds of this invention not only are extremely effective in enhancing the above characteristics of the hydrocarbon mixtures, but they also are hydrolytically stable so that the presence of water which is normal in petroleum streams and petroleum products can be tolerated.

The new esters of this invention are prepared by reacting the appropriate phenol or mixtures of phenols with the appropriate acid of boron. The appropriate phenol is a 2,6-dialkyl phenol having the configuration of the phenolic radicals shown in the above formulas.

The orthoborates of this invention can be prepared by reacting the orthoboric acid with the appropriate phenol or mixture of phenols.

The metaborate esters of this invention can be prepared by reacting metaboric acid with the appropriate phenol or mixture of phenols. Metaboric acid, in turn, can readily be prepared by heating orthoboric acid in the presence of an azeotroping agent such as toluene to remove water of dehydration.

The boronate esters of this invention can be prepared by reacting boron trihalide with Grignard reagent to form the acid dihalide of boronic acid, hydrolyzing this to the corresponding acid, and then reacting this acid with the appropriate 2,6-dialkyl phenol or mixtures of 2,6-dialkyl phenols. Preparation of the borinate esters of this invention is analogous.

The pyroborate esters of this invention can be conveniently prepared by transesterifying alkyl pyroborates prepared, for example, as by the method of U.S. Patent 2,721,121 with 2,6-dialkyl phenols of the type described above.

The esterification reactions whereby the esters of this invention are prepared are usually conducted at elevated temperature of 75 to about 150° C., and are conveniently carried out in the presence of a solvent which boils in this temperature range at the pressure employed. Suitable solvents include, benzene, toluene, xylene and the like.

The reaction rate can be increased by use of a catalyst, normally the type used in conventional esterification processes. The preferred catalysts are strong acids such as sulfuric acid, aromatic sulfonic acids and the like.

It is sometimes convenient to use minor amounts of aliphatic alcohols or phenols other than 2,6-dialkyl phenols to solubilize the 2,6-dialkyl phenols in the reaction medium. This leads to formation of minor amounts of mixed esters wherein a portion of the hydroxyl groups of the boron acid are esterified with a 2,6-dialkyl phenol and the remainder are esterified with the alcohol or other phenol. These mixed esters do not detract from the effectiveness of the esters wherein all the hydroxyl groups are esterified with 2,6-dialkyl phenols.

The following examples illustrate prepartions of typical compounds of this invention.

*Example I*

Metaboric acid was prepared by heating orthoboric acid to a temperature of 110° C. in the presence of toluene. The toluene forms an azeotrope with the water of dehydration and this azeotrope was removed by means of a water trap. To the residual metaboric acid was then added 2,6-di-tert-butyl phenol in the ratio of one mole to every mole of metaboric acid calculated as HOBO. This reaction mixture was then heated at 110° C. for 24 hours in the presence of sulfuric acid (0.06 percent of the weight of the total reaction mixture) and p-toluene sulfonic acid (0.1 percent of the weight of the total reaction mixture) as catalysts. At the end of this time the reaction mixture was cooled to room temperature and the product, tri(2,6-di-tert-butylphenyl)trimeric metaborate was obtained as a light brown crystalline solid. Recrystallization of this product from toluene yields a white crystalline solid.

*Example II*

Metaboric acid prepared by the procedure of Example I is reacted with 2,6-di-tert-butyl-4-methyl phenol, the reactant ratios being the same as in Example I. In this reaction the temperature is 110° C. and p-toluene sulfonic acid is used as a catalyst. A good yield of tri(2,6-di-tert-butyl-4-methylphenyl)trimeric metaborate is obtained.

*Example III*

By the procedure of Example II, tri(2,6-di-tert-octylphenyl)trimeric metaborate is obtained in good yield from metaboric acid and 2,6-di-tert-octyl phenol.

In a similar manner, the other metaborates of this invention can be prepared. For example, by reacting 2,6-diisopropyl-4-methoxy phenol with metaboric acid a good yield of tri(2,6 - diisopropyl-4-methoxyphenyl)trimeric metaborate is obtained. Similarly, metaboric acid and 2-ethyl-4-amino-6-tert-heptyl phenol give tri(2-ethyl-4-amino-6-tert-heptylphenyl)trimeric metaborate.

Example IV

To one mole of orthoboric acid is added 3 moles of 2,6-di-tert-butyl phenol in xylene solution and the mixture is heated at 140° C. for 24 hours. The tri(2,6-di-tert-butylphenyl)orthoborate which is formed is separated from the reaction mixture by crystallization in good yield.

Example V

Butyl-dichloro boronate is prepared by reaction of one mole of boron trichloride with one mole of butyl magnesium chloride in diethyl ether solution. Upon completion of the reaction two moles of water are added to hydrolyze the product to butyl boronic acid. To this reaction mixture is added 2-tert-butyl-6-tert-amyl phenol in benzene solution in the proportion of 2 moles of the phenol for every mole of the boron compound. After heating to 75° C. for 18 hours, di(2-tert-butyl-6-tert-amylphenyl)butyl boronate is formed in good yield.

Example VI

Dibutyl monochloro borinate is formed from 2 moles of ethyl magneisum bromide and 1 mole of boron tribromide in ether solution. This is hydrolyzed to the borinic acid by the procedure of Example V. To this reaction mixture is added 1 mole of 2,6-di-tert-butyl phenol in toluene solution and the resulting mixture is heated to 120° C. for 24 hours. The 2,6-di-tert-butyl phenyl dibutyl borinate which is obtained in good yield is separated from the reaction mixture by crystallization.

Example VII

A tetraalkyl pyroborate containing higher alkyl groups and prepared according to the method of U.S. Patent 2,721,121 is reacted wtih 2,6-diethyl phenol in the ratio of 4 moles of the phenol to 1 mole of the pyroborate ester. The reaction is conducted in benzene solution at a temperature of 75° C. in the presence of a small amount of sulfuric acid with the transesterification catalyst. The product, tetra(2,6-diethylphenyl)pyroborate is obtained in good yield.

The compounds of this invention are hydrolytically stable. Hydrolytic stability is measured by placing a sample of a compound of this invention in contact with about its own volume of water at room temperature for 24 hours. If substantially no hydrolysis of the compound occurs in 24 hours, the compound is said to be hydrolytically stable. This property is of extreme importance since it means that the compounds of the invention can be used with petroleum hydrocarbon mixtures without the necessity of drying the hydrocarbon prior to the treatment.

An outstanding utility of the compounds of this invention is in the treatment and admixture with liquid hydrocarbons, particularly of the petroleum types mentioned above. With many of these petroleum hydrocarbons many of the compounds of this invention form precipitates. These precipitates apparently contain some of the deleterious material in the hydrocarbon. Separation of the precipitate from the hydrocarbon removes the deleterious material and enhances the characteristics of the hydrocarbon. With others, no precipitate is formed, and in this instance, benefits are obtained by additon of the compounds of this invention to the hydrocarbon. In the instances where the precipitates are formed, adjustment of amounts of the boron compound, so that residual boron compound remains in the hydrocarbon after separatin of the precipitate, is beneficial. Likewise, benefits are obtained by adding additional amounts of boron compound after removal of the precipitate, even when the original boron compound is removed from the hydrocarbon composition by water washing.

In general, the amount of boron ester of this invention to be added to the hydrocarbon can be varied over a wide range and still give great effectiveness. In the lighter hydrocarbons of this invention, such as pure hydrocarbons, gasoline, jet fuel and the like, the amounts of ester chosen is such that the composition resulting contains from 0.01 to 1.5 grams of boron per gallon as the compound of this invention. In heavier hydrocarbons such as lube oil, the amount of ester is chosen so as to provide 0.01 to 0.1 percent of boron.

The following examples illustrate typical hydrocarbon aspects of this invention and the benefits derived.

Example VIII

To 100,000 parts of gasoline consisting of 45.2 volume percent paraffins, 28.4 volume percent olefins and 25.4 volume percent aromatics and containing 3.0 milliliters of tetraethyllead along with 1.0 theory of ethylene dichloride and 0.5 theory of ethylene dibromide (1 theory being the amount necessary to react completely with the lead to form lead dihalide) is added 25 parts of tri(2,6-di-tert-butylphenyl)trimeric metaborate. The resulting precipitate is removed by filtration leaving gasoline containing 0.01 gram per gallon of boron as 2,6-di-tert-butylphenyl metaborate. Substantially none of the gasoline is lost or wasted in the procedure. The resultant gasoline is found to have a lower surface ignition rate than previously and to be more stable toward decomposition by light.

Example IX

A portion of the gasoline composition of Example I, after removal of the precipitate, is washed with copious amounts of water until all the residual metaborate is removed. To this washed gasoline is added 1.5 grams per gallon of boron as methyl metaborate. It is found that this gasoline possesses enhanced combustion properties as compared with the same gasoline to which the same amount of methyl metaborate is added without the benefit of the pre-treatment by the compound of the present invention.

In this connection it is to be noted that the treatment with a compound of this gasoline enhances the response of the gasoline not only to further additions of compounds of this invention but to additions of other boron compounds as well.

Example X

To 100,000 parts of JP–5 jet fuel is added 100 parts of tri(2,6 - diisopropylphenyl)trimeric metaborate. The resulting jet fuel composition possesses enhanced thermal stability and combustion properties.

Example XI

To 100,000 parts of phenol treated, mixed base hydrocarbon mineral oil having a viscosity of 53.4 Saybolt Universal Seconds at 210° F. and a viscosity index of 103 is added 10 parts of 2,6-di-tert-amyl-3-chlorophenyl metaborate. The resulting lubricating oil composition possesses enhanced thermal stability characteristics.

Similar results are obtained with the above and other hydrocarbons are treated or admixed with the other metaborates of this invention.

Example XII

To 100,000 parts of toluene is added 50 parts of tri(2-ethyl-6-tert-butylphenyl)orthoborate. The resulting mixture possesses enhanced combustion properties.

Example XIII

To 100,000 parts of hydrocarbon diesel fuel having a cetane number of 51.7 and API gravity of 37.0, a heat content of 19620 B.t.u. per pound and a 50 percent boiling point of 509° F. is added 100 parts of tetra(2,6-dibutylphenyl)pyroborate. The resulting blend possesses superior combustion properties, particularly with regard to smoking tendencies.

*Example XIV*

To 50,000 parts of liquefied petroleum gas consisting chiefly of propane and butane is added 50 parts of di(2,6-diisopropylphenyl)dodecylboronate. The resulting blend possesses superior combustion properties.

*Example XV*

To 100,000 parts of cracked unleaded gasoline is added 100 parts of 2,6-di-tert-butylphenyl diethylborinate. The resulting gasoline blend possesses superior combustion properties and superior susceptibility toward addition of tetraethyllead.

As an aid in blending the compounds of this invention with fuels, it is frequently advantageous to prepare a stock solution which is a concentrated solution of the boron compound of this invention in hydrocarbons. Aromatic hydrocarbons such as benzene, toluene and xylene are preferred for such stock solutions. The amount of ester in the stock solution generally ranges up to about 5 percent.

The esters used in the above discussion and examples are illustrative only of the compounds of this invention. Additional esters include Tri(2,6-diethylphenyl)trimeric metaborate,
Tri(2,6-didodecylphenyl)trimeric metaborate,
Tri(2,6-diethylphenyl)orthoborate,
Tri(2,6-di-tert-octylphenyl)orthoborate,
Tri(2,6-didodecylphenyl)orthoborate,
Tetra(2,6-diethylphenyl)pyroborate,
Tetra(2,6-dioctylphenyl)pyroborate,
Tetra(2,6-didodecylphenyl)pyroborate,
Di(2,6-diethylphenyl)ethylboronate,
(2,6-diethylphenyl)diethylborinate,
Di(2,6-di-tert-butylphenyl)(2,6-diisopropylphenyl)-metaborate,
Tri(2,6-di-tert-butyl-4-acetylphenyl)trimeric metaborate,
and the like.

We claim:
1. A normally liquid hydrocarbon fuel, said fuel being substantially free of metaborate-induced precipitate and containing a small amount of a gasoline-soluble organic boron compound, said metaborate having the formula

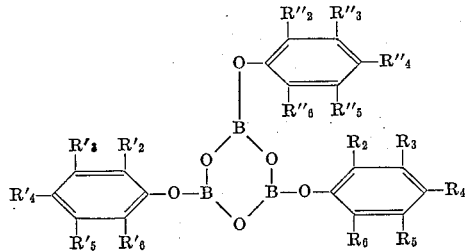

wherein $R_2$, $R'_2$, $R''_2$, $R_6$, $R'_6$ and $R''_6$ are tertiary alkyl radicals containing from four to eight carbon atoms, and $R_3$, $R'_3$, $R''_3$, $R_4$, $R'_4$, $R''_4$, $R_5$, $R'_5$ and $R''_5$ are selected from the group consisting of hydrogen, alkyl radicals, alkoxy radicals, halogen atoms and amino groups.

2. The composition of claim 1 wherein said liquid hydrocarbon fuel is gasoline.

3. The composition of claim 2 wherein said metaborate is 2,6-di-tert-butylphenyl metaborate.

4. A hydrocarbon fuel composition consisting essentially of a major proportion of a normally liquid hydrocarbon and from 0.01 to 1.5 grams of boron per gallon as a metaborate having the formula

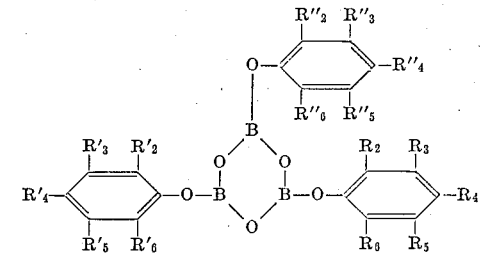

wherein $R_2$, $R'_2$, and $R''_2$, $R_6$, $R'_6$, and $R''_6$ are tertiary alkyl radicals containing from four to eight carbon atoms, and $R_3$, $R'_3$, and $R''_3$, $R_4$, $R'_4$, and $R''_4$, $R_5$, $R'_5$, and $R''_5$ are selected from the group consisting of hydrogen, alkyl radicals, alkoxy radicals, halogen atoms, and amino groups.

5. The composition of claim 4, wherein said liquid hydrocarbon is gasoline.

6. The composition of claim 4, wherein said metaborate is 2,6-di-tert-butylphenyl metaborate.

References Cited by the Examiner

UNITED STATES PATENTS

| | | | |
|---|---|---|---|
| 2,260,337 | 10/1941 | Prescott et al. | 260—462 |
| 2,462,616 | 2/1948 | Eby et al. | 252—49.6 |
| 2,741,548 | 4/1956 | Darling et al. | 44—76 X |
| 2,767,069 | 10/1956 | Fay et al. | |
| 2,809,617 | 10/1957 | Bartleson et al. | 44—76 |
| 2,878,256 | 3/1959 | Hunter et al. | 44—63 |
| 2,891,004 | 6/1959 | Mattox | 208—292 |
| 3,009,797 | 11/1961 | Dykstra | 44—76 |
| 3,030,196 | 4/1962 | Dykstra | 44—69 |

DANIEL E. WYMAN, *Primary Examiner.*

JULIUS GREENWALD, *Examiner.*

C. O. THOMAS, Y. M. HARRIS, *Assistant Examiners.*